United States Patent
Cohen et al.

(10) Patent No.: US 9,237,343 B2
(45) Date of Patent: Jan. 12, 2016

(54) PERCEPTUALLY CODING IMAGES AND VIDEOS

(71) Applicant: Mitsubishi Electric Research Laboratories, Inc., Cambridge, MA (US)

(72) Inventors: Robert A Cohen, Somerville, MA (US); Guoxin Jin, Chicago, IL (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 563 days.

(21) Appl. No.: 13/672,314

(22) Filed: Dec. 13, 2012

(65) Prior Publication Data

US 2014/0169451 A1    Jun. 19, 2014

(51) Int. Cl.

| H04N 1/00 | (2006.01) |
|---|---|
| H04N 19/50 | (2014.01) |
| H04N 19/176 | (2014.01) |
| H04N 19/103 | (2014.01) |
| H04N 19/154 | (2014.01) |

(52) U.S. Cl.
CPC ....... *H04N 19/00569* (2013.01); *H04N 19/103* (2014.11); *H04N 19/154* (2014.11); *H04N 19/176* (2014.11)

(58) Field of Classification Search
CPC .......... H04N 19/00569; H04N 19/103; H04N 19/154; H04N 19/176
See application file for complete search history.

(56) References Cited

U.S. PATENT DOCUMENTS

| 6,037,987 | A * | 3/2000 | Sethuraman | 375/240.03 |
|---|---|---|---|---|
| 6,067,322 | A * | 5/2000 | Wang | 375/240.17 |
| 8,059,720 | B2 * | 11/2011 | Lee et al. | 375/240.16 |
| 2002/0168007 | A1 * | 11/2002 | Lee | 375/240.03 |
| 2004/0151394 | A1 * | 8/2004 | Soderberg et al. | 382/250 |
| 2008/0025392 | A1 * | 1/2008 | Lee et al. | 375/240.03 |
| 2009/0285308 | A1 * | 11/2009 | Panchapakesan et al. | 375/240.24 |
| 2010/0027898 | A1 * | 2/2010 | Lee et al. | 382/236 |
| 2010/0074467 | A1 * | 3/2010 | Lu | 382/100 |
| 2011/0243228 | A1 * | 10/2011 | Ngan et al. | 375/240.13 |
| 2011/0255589 | A1 * | 10/2011 | Saunders et al. | 375/240.01 |
| 2012/0082223 | A1 * | 4/2012 | Karczewicz et al. | 375/240.12 |
| 2012/0114048 | A1 * | 5/2012 | Sole et al. | 375/240.25 |

OTHER PUBLICATIONS

Wang et al., Image Quality Assessment: From Error Visibility to Structural Similarity, Apr. 20014, IEEE Transactions on Image Processing, vol. 13, No. 4.*

(Continued)

*Primary Examiner* — Sath V Perungavoor
*Assistant Examiner* — Peter D Le
(74) *Attorney, Agent, or Firm* — Dirk Brinkman; Gene Vinokur

(57) ABSTRACT

Blocks in pixel images are template matched to select candidate blocks and weights according to a structural similarity and a perceptual distortion of the blocks. The perceptual distortion is a function of a just-noticeable-distortion (JND). A filter outputs a prediction residual between the block and the candidate blocks. The prediction residual is transformed and quantized to produce a quantized prediction residual using the JND. The matching and quantizing is optimized jointly using the perceptual distortion. Then, the quantized prediction residual and the weights are entropy encoded into a bit-stream for later decoding.

18 Claims, 6 Drawing Sheets

(56) References Cited

OTHER PUBLICATIONS

Hontsch and L. Karam, "Adaptive Image Coding with Perceptual Distortion Control," Image Processing, IWWW Transactions on, vol. 11, No. 3, pp. 213-222, Mar. 2002.

G. Jin, Y. Zhai, T. Pappas, and D. Neuhoff, "Matched-texture coding for structurally lossless compression," in IEEE International Conference on Image Processing (ICIP), 2012, Orlando, Florida, Sep. 2012.

J. Albert J. Ahumada and H. A. Peterson, "Luminance-model-based DCT quantization for color image compression," SPIE, Huma n Vision, Visual Processing, and Digital Display III, vol. 1666, p. 365, Sep. 1992.

] C. Lan, J. Xu, F. Wu, and G. Shi, "Intra frame coding with template matching prediction and adaptive transform," in Image Processing (ICIP), 2010 17th IEEE International Conference on, Sep. 2010, pp. 1221-1224.

* cited by examiner

200

300

400

500

PERCEPTUALLY CODING IMAGES AND VIDEOS

FIELD OF THE INVENTION

The invention relates generally to coding images and video, and more particularly to methods for coding images and video based on visual perception.

BACKGROUND OF THE INVENTION

1. General Background

In image and video coding, compression efficiency is achieved by exploiting spatial redundancies in input images, to produce a file or bit-stream representing the images using fewer bits than in the uncompressed images. In video coding, both spatial and temporal redundancies are used. Intra coding are coding techniques using only spatial redundancy, i.e., pixels in a block of the current image exploit redundancy from previously-decoded pixels in the same image. Temporal redundancy is leveraged in inter coding, where pixel data from previously-decoded images, other than the current image are used in the compression process.

In the High Efficiency Video Coding (HEVC) standard and other common standards, the encoder or decoder make decisions on modes and parameters based on a cost function or metric. The cost typically considers the rate, or number of bits needed to code the image or video using a given mode or parameter, and a distortion metric, typically a mean-square error (MSE) or a mean-absolute error.

The distortion or error metrics is typically determined on a pixel-by-pixel basis, e.g., a difference of pixels between two blocks of data. The distortion metrics, however, do not fully consider aspects of human perception that affect the visibility of the distortion. For example, the human visual system is less sensitive to distortion in very bright or very dark areas of an image as compared to distortion in regions of an image that have a medium level of brightness. Taking the mean-square error between two blocks of pixels does not take advantage of these aspects of human perception.

Image and video schemes that incorporate human perception have typically adjusted how quantization is applied after a block of the image undergoes a transformation. For example, a Discrete Cosine Transform (DCT) may be applied to a block of pixels, and then the resulting transform coefficients are quantized using quantizers with different levels of coarseness. Variations in very high frequencies are often less perceptible to the human visual system than are the lower frequencies, so high-frequency coefficients may be quantized more coarsely than coefficients corresponding to smooth areas of a block. Similarly, very bright or dark areas may be quantized more coarsely than medium-intensity areas of an image.

HEVC and similar coding systems use prediction to achieve high compression efficiency. Currently, the various prediction modes available to the codec are selected based on minimizing a cost that includes mean-square or absolute errors between blocks of pixels.

To the best of our knowledge, perceptual techniques have not used for computing a prediction.

The result of this non-perceptual prediction is that the predicted block or image does not necessarily appear to resemble the block or image that is being predicted. For example, the predicted image may appear very blurred, or the image may appear to be a combination of disjoint blocks with various directional features or varying intensities.

Because metrics such as mean-square or mean-absolute error do not always correlate with perceptual quality, there is a need for metrics that better incorporate human perception throughout the coding system. In addition to perceptual techniques being used during quantization, there is also a need for such metrics to be used in the prediction process. Methods for jointly optimizing the prediction and quantization process do not presently exist, and are therefore needed as well.

In addition to perceptually-based metrics, the prediction process itself can be performed in a way that considers human perception. For example, to predict a given block of pixels, the current predictor in HEVC interpolates or copies adjacent pixels from neighboring blocks. The standard does not consider pixels that are not immediately adjacent to the current block, so perceptual or structural similarities among the current block and previously-decoded blocks cannot be leveraged.

2. Detailed Background

Therefore, image and video coding is one of the most critical techniques in modern multimedia signal processing. The state-of-the-art image codecs such as JPEG 2000 and JPEG XR, and video codecs such as H.264/AVC and the proposed High Efficiency Video Coding (HEVC) standard can compress image or video at considerably low bit rates with good quality. However, the quality and mode-dependent decisions inside the codecs are typically measured using mean-square error, which is related to the peak signal-to-noise ratio (PSNR), or mean-absolute error, which are well known metrics that do not necessarily related to the ultimate signal receiver, i.e., human vision system (HVS). For example, a viewer may tolerate more distortion on a dark object in a dark background region than a brighter object on a medium-intensity background. By exploiting the characteristics of human perceptual system, redundant information can be discarded without noticeable distortion, and thus the bit-rate of the coded signal can be significantly reduced. Spatial or frequency component correlations are widely considered with techniques such as motion compensation, template matching, and adaptive prediction, but not perceptually optimized coders. Additionally, the distortion that cannot be perceived by the HVS is usually not measured objectively.

To study HVS, subjective tests, using simple excitation such as uniform luminance blocks, sinusoid gratings and Gabor patches, can be used to determine the detection threshold of distortion or of the signal. These experimental results are related to Just-Noticeable-Distortion (JND) and the results are modeled mathematically in order to be used in the image and video codecs. Theoretically, as long as the distortion or signal level is below JND, it should not be perceived by the HVS (perceptually lossless). In an image or video coding context, ideally the coder only allocates bits for signaling portions of the image for which the distortion that greater or equal to JND, or the so-called Supra-threshold Distortion (StD). JND as used herein is a term of art related to the work of Ernst Heinrich Weber and Gustav Fechner (~1850).

Human Vision System and Just Noticeable Distortion

The HVS is a very complex, much is not understood. At a lower level, the HVS is known to perform a sub-band decomposition. Also the HVS does not consider different visual information, e.g., intensity and frequency, as having the same importance. Psychophysics studies shows four aspects affect the detection threshold of distortion (or signal) in HVS. They are luminance adaptation, contrast sensitivity, contrast masking and temporal masking.

Luminance adaptation indicates the nonlinear relationship between perceived luminance and true luminance displayed. Luminance adaptation is also called luminance masking because the luminance of the signal masks the distortion. The luminance adaptation is usually tested by showing a patch of uniform luminance as the excitation against the background which has different luminance. The detection sensitivity is modeled by the Weber-Fechner Law, such that when the excitation is just noticeable, the luminance difference between the patch and background divided by luminance of background is a constant. In other words, the brighter the background is, the higher the detection threshold will be, meaning that the sensitivity to distortion is lower. However, due to the ambient illumination of many display devices, the masking in very dark regions is stronger than that in very bright regions.

Contrast sensitivity refers to the reciprocal of the contrast detecting threshold, which is the lowest contrast at which the viewer can just barely detect the difference between the single frequency component, a sinusoidal grating, and the uniform luminance background. Here, contrast means the peak-to-peak amplitude of sinusoidal grating. The sensitivity varies in depending upon the background luminance. Experiment have shown sinusoids of light for different wavelengths (red, green and blue) and different luminance levels to human viewers. When the background luminance is relatively low, e.g., <300 photopic Trolands (Td), the detection threshold obeys de Vries-Rose law with respect to frequency, in which the threshold increases in proportion to the reciprocal of the square root of the luminance. When the background luminance is high (>300 Td), then the detection threshold follows the Weber-Fechner law. The contrast sensitivity function has important impact for perceptual image or video coding.

Contrast masking is the effect of reducing the perceivability of the distortion (or signal) by the presence of a masking signal. For example, many coding artifacts in the complex regions, such as tree leaves and sand, are less visible than those in the uniform regions such as the sky. In this case, the high spatial-frequency components in complex regions mask the high spatial-frequency components in the artifacts. The masker usually has a similar spatial location and spatial-frequency components as the distortion (or signal). Therefore, contrast masking is sometimes called texture masking. When contrast masking is analyzed with sinusoidal gratings having different frequencies and grate widths, the results show that the detection threshold for the high contrast masker follows a power law, and the low contrast masker reduces the detection threshold. By quantitatively measuring the detection threshold for different background luminance of varieties of subjects, the threshold modulation curves, namely the adjusted contrast sensitivity function (CSF) can be plotted.

Temporal masking in video coding refers to the reduction in the perception of distortion (or signal) in the presence of high temporal frequencies. When the motion is fast, details in individual video frames is more difficult to detect. In addition to depending upon the temporal frequency, temporal masking also depends upon a function of spatial frequency. The sensitivity is modeled as a band-pass filter at low spatial frequencies and a low-pass filter at high spatial frequencies.

Perceptual Quality Metrics

In addition to JND, another important technique that can improve perceptual image or video coding is the quality metric which approximates subjective characteristics of a viewer. Instead of considering quality only from the Signal-to-Noise Ratio (SNR) point of view, many metrics based on the nature of HVS are known. The model-based perceptual quality metrics use the idea of filter banks similar to HVS, such as the Cortex Transform, Gabor filters, and steerable filters to decompose the image into sub-bands and analyze the perceptual characteristics to quantitatively determine the quality. A good example of a model-based metric is the visible difference predictor (VDP). Because model-based metrics are computationally complex, signal-driven metrics, which do not try to build a HVS model, are preferred. Signal-driven metrics extract only the characteristics or statistics of a signal for evaluation purposes.

Within the category of signal-driven metrics, structural approaches show great success in image processing. The quality is measured in the sense of structural similarity between the original image and the coded version. A good coder can reconstruct totally different images or image blocks in the MSE sense, without effecting the viewing quality. The issue with the MSE or PSNR is that images are strongly locally correlated 2D signals, which information beyond single pixel intensity levels. In fact, the information includes shapes, patterns, colors, edges, and so forth. A good metric should maximize similarities, and be invariant to translation, scaling and rotation. Moreover, the metric should also invariant to light intensity and chroma changes.

A well-known structural similarity metric is SSIM, see Appendix for definitions used herein. SIMM can be used for the spatial domain and applied to sub-bands. The metric SSIM(x, y) between two blocks of pixels or values x and y is defined as $$\frac{(2\mu_x\mu_y + C_1)(2\sigma_{xy} + C_2)}{(\mu_x^2 + \mu_y^2 + C_1)(\sigma_x^2 + \sigma_y^2 + C_2)}, \qquad (1)$$

where $\mu_x$ is the mean value of block x, $\mu_y$ is the mean value of block y, $\sigma_x^2$ is the variance of block x, $\sigma_y^2$ is the variance of block y, $\sigma_{xy}$ is the covariance between blocks x and y, and $C_1$ and $C_2$ are constants.

The input image x (or block) and the predicted output image y (or block) are decomposed into S levels and L orientations using an orientation-selective convolution kernel (steerable filter). As a result, there are S×L sub-bands plus one low-pass band and one high-pass band. The local mean, variance of corresponding sub-bands, and the covariance between x and y in each sub-band are determined using a small sliding window. For each subwindow in each sub-band, the local SSIM score is determined using (1). The overall SSIM score is a floating-point number between 0 and 1, which is an arithmetic average of all scores over all sub-bands and all subwindows. A more complex and accurate metric called structure texture similarity (STSIM) improves on SSIM by using statistics between sub-bands with different orientations and scale. STSIM also discards the $\sigma_{xy}$ term from SSIM. Herein, we use SSIM for simplicity.

Related Work

Many researchers have studied the perceptual distortion visibility model or equivalent CSF model since the 1960s. Data for JND models generally come from psychophysical experiments. Using these models, researchers have proposed variants of coding algorithms. In general the models are classified into spatial domain models, which use local pixel values to determine the detection threshold of distortion, and sub-band domain models which usually adjust the CSF to determine the distortion tolerance in different sub-bands.

Sub-Band Domain JND Model and Perceptual Coding

One model is a contrast masking model in a generalized quadrature mirror filter (GQMF) sub-band domain given a uniform background gray level of 127. The baseline sub-band sensitivity and sensitivity adjustment for different luminance values are measured subjectively and tabulated. The texture masking is determined by the texture energy of each of the sub-bands. The overall sensitivity is the product of the baseline sensitivity, luminance adjustment and texture masking. Each sub-band is then DPCM-coded and quantized using the overall sensitivity as the quantization steps.

A subjective experiment on sensitivity for different colors (RGB) with 8×8 DCT basis functions has shown that the DC sensitivity plot has a "U-shape" vs. the background luminance, and the AC sensitivity logarithmically increases with respect to the basis function magnitude. Based on the experiments, a quantization matrix can be generated that can be used in a visually lossless coding scheme.

Parabolic fitting of 1D contrast sensitivity experimental results can be used to build a 2D CSF by orthogonally combining two 1D CSFs with consideration of the correlation between different dimensions. The CSF is a function of luminance which can be estimated from the image. A parabolic model can be used to determine the CSF in DCT sub-bands and was applied to the quantization matrix, see Ahumada et al., "Luminance-model-based DCT quantization for color image compression," SPIE, Human Vision, Visual Processing, and Digital Display III, vol. 1666, p. 365, September 1992.

Another model is a contrast masking model for HVS. The response of the HVS depends on the excitation of the receptive field and on the inhibitory inputs. The relationship is modeled as excitation divided by inhibition called target threshold vs. masker contrast function (TvC).

A perceptual coder called DCTune uses luminance adaptation and contrast masking to adjust the quantization matrix in DCT sub-bands.

A Visible Difference Predictor (VDP) is an image quality metric considering luminance adaptation, contrast sensitivity and contrast masking. VDP assumes the luminance adaptation occurs locally around a fixation area. A 2D CSF model in the frequency domain is known. A Cortex Transform is used to decompose the image.

The JND model can be modified for a 16 sub-band GQMF decomposition. The model considers the luminance adaptation and inter or intra masking. The base luminance sensitivity is measured numerically without a closed form. The JND measurement is adapted locally without the need for transmitting side information.

A DCT-domain JND model for video coding considers contrast sensitivity, a luminance adaptation model, and texture contrast masking. Those aspects are assisted using edge detection and temporal contrast sensitivity, along with temporal frequency associated with eye movement.

A spatio-temporal JND model considers the eye movement for video in the DCT sub-bands. The model incorporates spatio-temporal CSF, eye movement, luminance adaptation and contrast.

Spatial Domain JND Model and Perceptual Coding

A spatial domain JND model can be used as the maximum of spatial masking and luminance adaption. The model can be relaxed by minimally noticeable distortion (MND), which can be used to control the rate-distortion optimizer. In addition to being used on a single image, JND models can also be applied to sequences.

Perceptual Based Rate-Distortion Optimization

In the HEVC and H.264/AVC standards, the encoder uses rate-distortion optimization (RDO) to output a bit-stream with the best picture quality with a rate R less than a given rate constraint $R_c$. This process can be expressed as $$\min\{D\} \text{ subject to } R \leq R_C, \quad (2)$$

where D is the distortion measurement, usually based on MSE. In order to incorporate a perceptual quality measurement, D=1−SSIM in H.264/AVC, where SSIM is the structural similarity metric given above in (1). This produces a better perceptual quality than H.264/AVC.

Perceptual Based Template Matching

Template-matching techniques generally use the MSE or Mean Absolute Error (MAE) as the matching criteria. Sparse reconstruction can be used as the constraint to solve the matching problem, or template matching can be used to determine candidates in the reconstructed image, and then use the candidates to train Karhunen-Loeve Transform (KLT) adaptively for transform coding.

FIG. 1 shows the modules or processing steps in a conventional H.264/AVC or HEVC encoder. Prediction 110 is applied to an input signal, e.g., a next (target) block to be coded in an image or video, followed by a transformation 120, quantization 130, and coding 140 to produce an output signal 109, e.g., a compressed image or video. Feedback from RDO 150 is used for the predition and quantization.

H.264/AVC and HEVC iteratively use RDO to determine the optimal prediction and quantization. Conventional perceptual based image coding methods either focus on adjusting the quantization matrix based on JND metrics, or on using perceptual-based metrics to perform RDO.

Hence, it is desired to develop models and associated coding techniques that maintain the perceptual quality of processed images. It is also desired to develop models and associated coding techniques that jointly optimize multiple elements of the encoder or decoder such as prediction and quantization, using perceptual metrics.

SUMMARY OF THE INVENTION

It is also an object of a present invention to provide a method for coding, i.e., encoding and decoding, of at least a portion of an image. It is another object of the invention to provide such a method that optimizes, e.g., minimizes, a size of an encoded bit-stream transmitted over a channel. It is yet another object of the invention to provide a method that incorporates perceptual metrics in the coding process, and methods to jointly optimize modules that use these perceptual metrics. Another object of the invention to use perceptual aspects to determine a prediction.

Therefore, the embodiments of the invention provide a method for coding one or more images which jointly applies perceptual quality metrics to prediction, quantization and rate-distortion optimization (RDO) of the bit-stream suitable for the proposed High Efficiency Video Coding (HEVC) standard.

A prediction approach, which uses template matching, is described. The template matching uses a structural similarity metric (SSIM) and a Just-Noticeable Distortion (JND) model. Matched candidates are combined to generate a prediction. The embodiments can also modify the JND model and use Supra-threshold Distortion (StD) as the distortion measurement in RDO.

Specifically, blocks in pixel images are template matched to select candidate blocks and weights according to a structural similarity and a perceptual distortion of the blocks. The perceptual distortion is a function of a just-noticeable-distortion (JND). A filter outputs a prediction residual between the block and the candidate blocks. The prediction residual is transformed and quantized to produce a quantized prediction residual using the JND. The matching and quantizing is optimized jointly using the perceptual distortion. Then, the quantized prediction residual and the weights are entropy encoded into a bit-stream.

DETAILED DESCRIPTION OF THE INVENTION

Embodiments of our invention provide a system and a method for coding an image or video, in other words a sequence of (one or more) images. As used herein coding can include encoding, decoding or both, as in an encoder, decoder or codec.

In contrast with the prior art, we apply perceptual based metrics to determine a perceptually-optimal prediction, jointly with a perceptually adjusted quantizer.

Encoder

Figure 1:
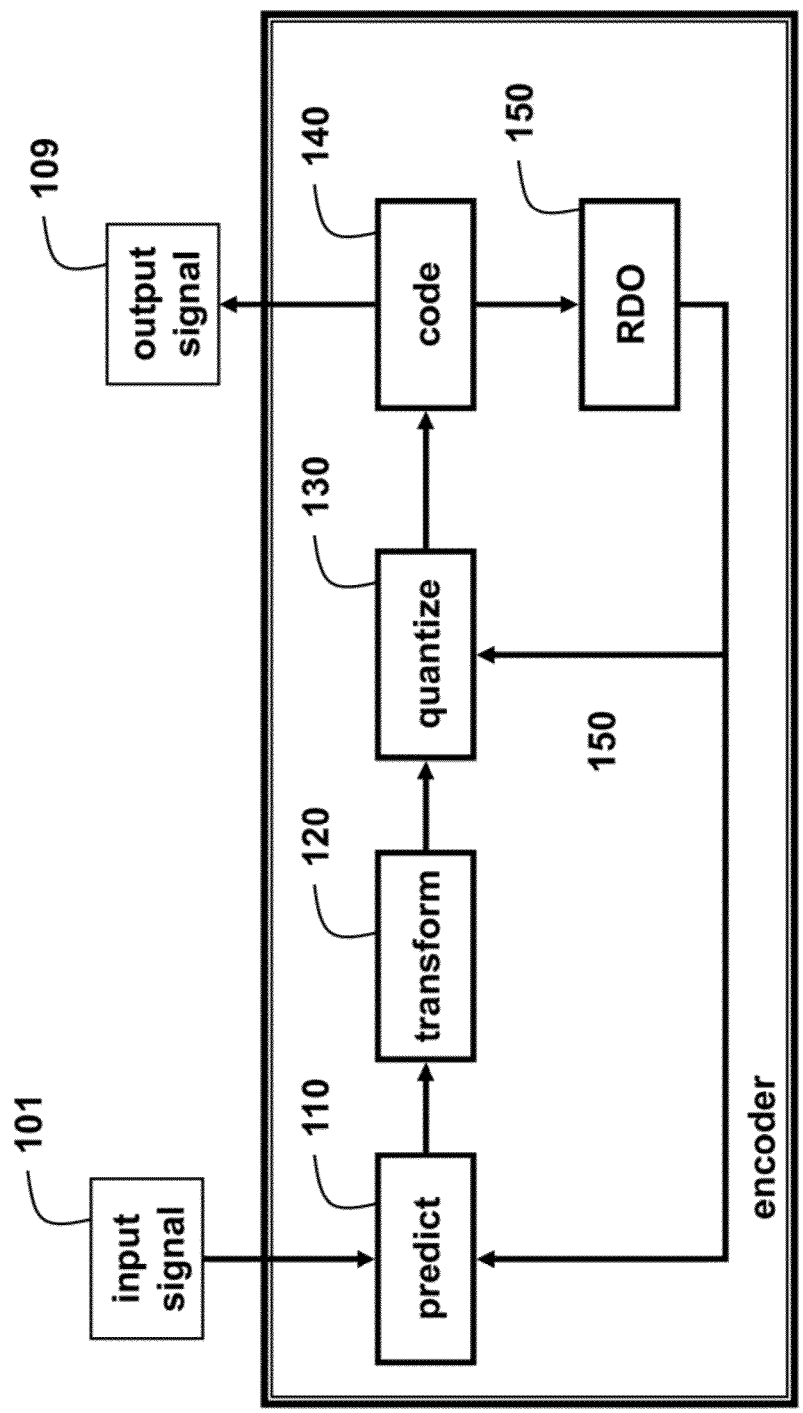
FIG. 1 is a block diagram of a conventional encoder.
Figure 2:
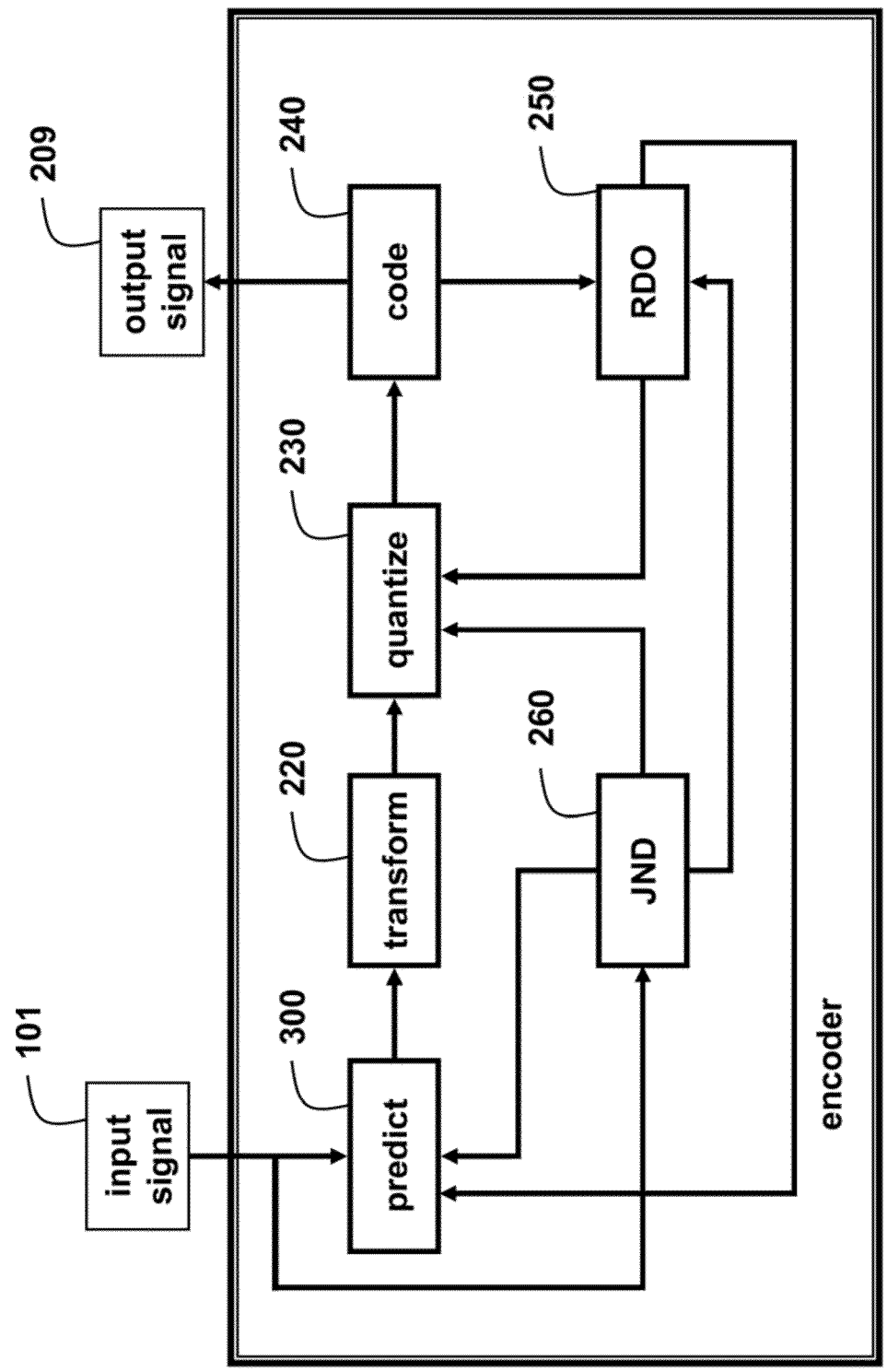
FIG. 2 is a block diagram of an encoder according to embodiments of the invention.

FIG. 2 shows the modules or processing steps in an encoder 200 according to embodiments of the invention.

Prediction 300 is applied to the input signal 101, e.g., a next block to be coded in an image or video (the sequence of one or more images), followed by a transformation 220, quantization 230, and coding 240 to produce an output signal 209, e.g., a compressed image or video, with an improved perceptual quality. Feedback from RDO 250 is used for the predition and quantization.

The input signal is also provided to a Just-Noticeable-Distortion (JND) module 260, as described in greater detail below. Output from the JND is proved to the prediction, quantization and RDO to exploit a local structural similarity metric (SSIM).

As used herein, JND is not a relative term but a term of art that refers to the HVS of human observers to detect distortion, i.e., the maximum distortion thresholds in pixels or subbands that the HVS does not perceive.

Perceptual Quantization

The embodiments of the invention use a novel perceptual template matching metric based on SSIM and JND models during the coding. Because HEVC quantizes prediction residues in the transform domain, we adapt a model described by Ahumada et al., see above. Our novel JND model corrects two problems with the Ahumada model, see below.

Given an N×N block in the input image as the coding target, HEVC uses non-uniform scalar quantization for the DCT coefficient residue $\epsilon e_{m,n} = X_{m,n} - \hat{X}_{m,n}$, where m,n=0, 1, 2, ..., N−1 are indexes of DCT sub-bands, $X_{m,n}$ are the DCT coefficients of the target block x at sub-band or coefficient location (m,n), and $\hat{X}_{m,n}$ are the DCT coefficients of the prediction of the target block at sub-band (m,n). Similar to other intra-frame coding algorithms, it is well known that the DC coefficient and low frequency AC coefficients should be quantized finer than the high frequency coefficients in order to achieve the best perceptual rate-distortion performance.

In a scalar quantizer, a set of discrete values or quantization steps are typically defined. The input to the quantizer is mapped to a quantization step, usually to the step that minimizes distortion. Thus, an input scalar or value quantizes to the quantizer step just below or just above that value. The maximum error occurs when the input scalar is halfway between the quantization steps. Considering that JND theoretically is the least distortion that the HVS can perceive, it is desirable to have the maximum quantization error be less than the JND. Since the maximum quantization error occurs when the input scalar is halfway between the quantization steps, the distance between the steps, i.e., quantization step size, Q for sub-band (m,n) is twice the JND $T_{m,n}$, as follows:

$$Q_{m,n} = 2T_{m,n}. \quad (3)$$

Here, we use the JND model in DCT sub-bands $T_{DCT}$, which is determined by the product of the contrast sensitivity function adjusted by luminance and scaled by DCT coefficients, and a contrast masking (CM) adjustment $a_{CM}$:

$$T_{m,n} = T_{DCT}(m,n) \times a_{CM}(m,n). \quad (4)$$

The CSF is an exponential function depending on the background luminance and sub-band frequency, excluding the DC sensitivity for which both m and n are equal to zero:

$$\log_{10} T_{CSF}(m,n) = \log_{10}\left(\frac{T_{min}}{r + (1-r)\cos^2\theta_{m,n}}\right) + K(\log_{10} f_{m,n} - \log_{10} f_{min})^2, \quad (5)$$

where the variables are defined below.

The scaled version of the CSF is used in (4) is $$T_{DCT} = \frac{MT_{CSF}(m,n)}{2\alpha_i \alpha_j (L_{max} - L_{min})}, \quad (6)$$

where M is the number of gray levels (e.g., 256), and $L_{max}$ and $L_{min}$ in are the maximum and minimum display luminance. Given a block with $N_{DCT}$ transform coefficients, $\alpha_i$ or $\alpha_j$ are DCT normalization factors ($N_{DCT}$):

$$\alpha_i = \frac{1}{\sqrt{N_{DCT}}} \begin{cases} 1, & i=0 \\ \sqrt{2}, & i \neq 0 \end{cases} \quad (7)$$

$$\theta_{m,n} = \arcsin\frac{2f_{i,0}f_{0,j}}{f_{i,j}^2}$$

$$f_{i,j} = \frac{1}{2N_{DCT}}\sqrt{\left(\frac{i}{\omega_x}\right)^2 + \left(\frac{j}{\omega_y}\right)^2}. \quad (8)$$

Here, $\omega_x$ and $\omega_y$ are the horizontal width and vertical height of a single pixel in degrees of visual angle, $$w_x = (360/\pi) \times \arctan(W_{screen}/2D_v W_{resolution}),$$

$$w_y = (360/\pi) \times \arctan(H_{screen}/2D_v H_{resolution}),$$

where $D_v$ is the viewing distance from the center of screen, and $W_{screen}$ is the width of display screen in (mm), $W_{resolution}$ and $H_{resolution}$ are the width and height in pixels of the display, θ is an angle of orientation, and $f_{i,j}$ is a measure of the spatial frequency.

The expression in (5) is an approximation of psychophysical experimental data of the CSF using a parabola. Here, $f_{min}$ is the spatial-frequency where the detection threshold is the smallest, i.e., where the sensitivity is the highest. The detection threshold at $f_{min}$ is $T_{min}$ and the bandwidth of the CSF is determined by K. With L being the local background luminance $L = L_{min} + (L_{max} - L_{min})/M$, we obtain $$f_{min} = \begin{cases} f_0 L^{\alpha_f} L_f^{-\alpha_f}, & L \leq L_f \\ f_0, & L > L_f, \end{cases}$$

$$T_{min} = \begin{cases} L^{\alpha_T} L_T^{1-\alpha_T}/S_0, & L \leq L_T \\ L/S_0, & L > L_T, \end{cases}$$

$$K = \begin{cases} f_0 L^{\alpha_K} L_K^{1-\alpha_K}, & L \leq L_K \\ K_0, & L > L_K. \end{cases}$$

The constants used by the Ahumada model are the result of least square fitting, e.g., $\alpha_T$=0.649, $\alpha_f$=0.182, $\alpha_K$=0.0706, $L_T$=13.45 cd/m2, $L_f$=$L_K$=300 cd/m2, $s_0$=94.7, $f_0$=6.78 cyc/deg and $K_0$=3.125.

However, there are two problems with the conventional Ahumada CSF model.

First, for the DC coefficient, the CSF is undefined. When both m, n are zero, $\theta_{m,n}$ in (7) approaches infinity.

Second, in the low frequency sub-bands, $f_{m,n}$ is relatively small when compared to $f_{min}$, such that the second term in (5) is extremely large. As a result, the conventional CSF model tends to over-estimate the detection threshold in low frequency sub-bands.

To correct the first problem, we use a local luminance adaptation model to estimate the detection threshold in the DC sub-band. We use the local mean $\mu_x$ for better quality in HEVC.

$$T_{CSF}(0,0) = \begin{cases} 17(1 - \sqrt{\mu_x/127} + 3), & \text{if } \mu_x \leq 127 \\ 3(\mu_x - 127)/128 + 3, & \text{if } \mu_x > 127. \end{cases} \quad (9)$$

To correct the second problem, we assign a lower bound to the minimum value of the spatial frequency to 1 to prevent $f_{min}/f_{m,n}$ from becoming too large.

Our contrast masking (CM) adjustment is $$a_{CM}(m,n) = \begin{cases} \max\left(1, \left|\frac{E(|X|)}{T_{DCT}(m,n)}\right|^\epsilon\right), & m \neq 0, n \neq 0 \\ 1, & \text{otherwise,} \end{cases} \quad (10)$$

where $E(|X|)$ is an average magnitude of local DCT coefficients, and $\epsilon$=0.6. The contrast masking adjustment uses an excitation or inhibition model to indicate the tolerable distortion in the spatial-frequency domain.

Perceptually-Based Intra Prediction

Given an N×N block of the input image to be coded, HEVC uses previously-decoded pixel values in a reconstructed image as part of the prediction process. The reconstructed pixels in the blocks immediately above and to the left of the target, if available, are used as the input of the predictor. There are 33 directional prediction modes ranging from approximately −135° to 45°. Two extra prediction modes, DC mode and Planar mode, are used to generate uniform or bilinear interpolated predictions. The HEVC Rate-Distortion Optimization (RDO) is used to determine the best prediction mode, and the best quadtree structure of a block. An alternative is to weight the distortions resulting from each prediction direction by a perceptual metric such as JND.

HEVC intra prediction, as well as with many other image coders, such as H.264/AVC intra prediction, consider the spatial correlation in the local 2D signal. As a result, a good prediction that minimizes the rate-distortion cost is expected. The accuracy of the prediction is measured as the MSE, such that the best prediction is the least MSE with respect to the target. In some cases, metrics with lower complexity than MSE are used to select a subset of intra prediction modes.

However, the MSE or similar absolute error metrics do not always accurately represent the perceptual quality of an image. To obtain a predictor that is more consistent with the HVS-related aspects of images, a perceptual quality metric can be used while selecting coding modes.

There are a number of structurally lossless candidates to replace the target in the reconstructed image, rather than relying on only the pixels adjacent to the target.

We described a novel intra prediction scheme that uses function of JND and SSIM as the quality metric, and determines a prediction from the structurally lossless candidates.

Figure 3:
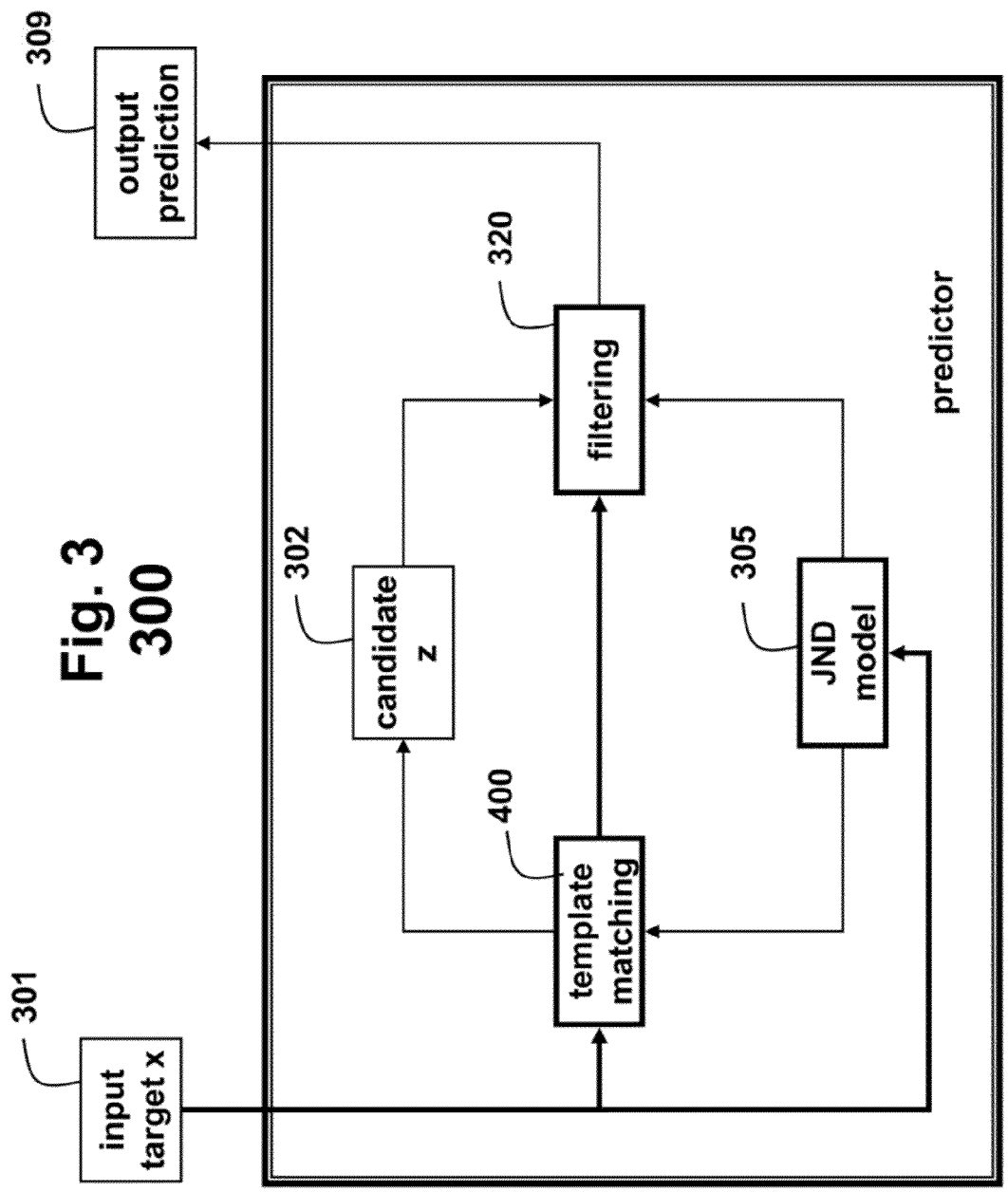
FIG. 3 is a block diagram of prediction according to embodiments of the invention.

As shown in FIG. 3, our predictor 300 uses neighboring previously coded blocks above and to the left (in a raster scan order) of the target block as the template 301. The template is matched 400 using a perceptual quality metric from the JND model 305 to determine up to K candidates z 302 having the best quality. A filter 320 is used to combine the optimal candidates to generate a prediction 309 of the target block.

There is some flexibility in our implementations. First, the number of best candidates K can vary depending on the filter and the quality metric. For example, the predictor only needs one candidate without filtering, or K=16 candidates with a median filter. Second, our predictor can be used as an extra mode in HEVC, in addition to the existing 35 modes, or our predictor can be the only mode that HEVC uses, to reduce the bits needed to signal the mode index. Third, because HEVC uses a quadtree structure to recursively code the target block, a cost function is used to determine the structure of the quadtree. The cost function is described below. In HEVC, the cost function uses the MSE or other similar metrics. In our coding scheme, we use perceptual quality metrics.

Figure 4:
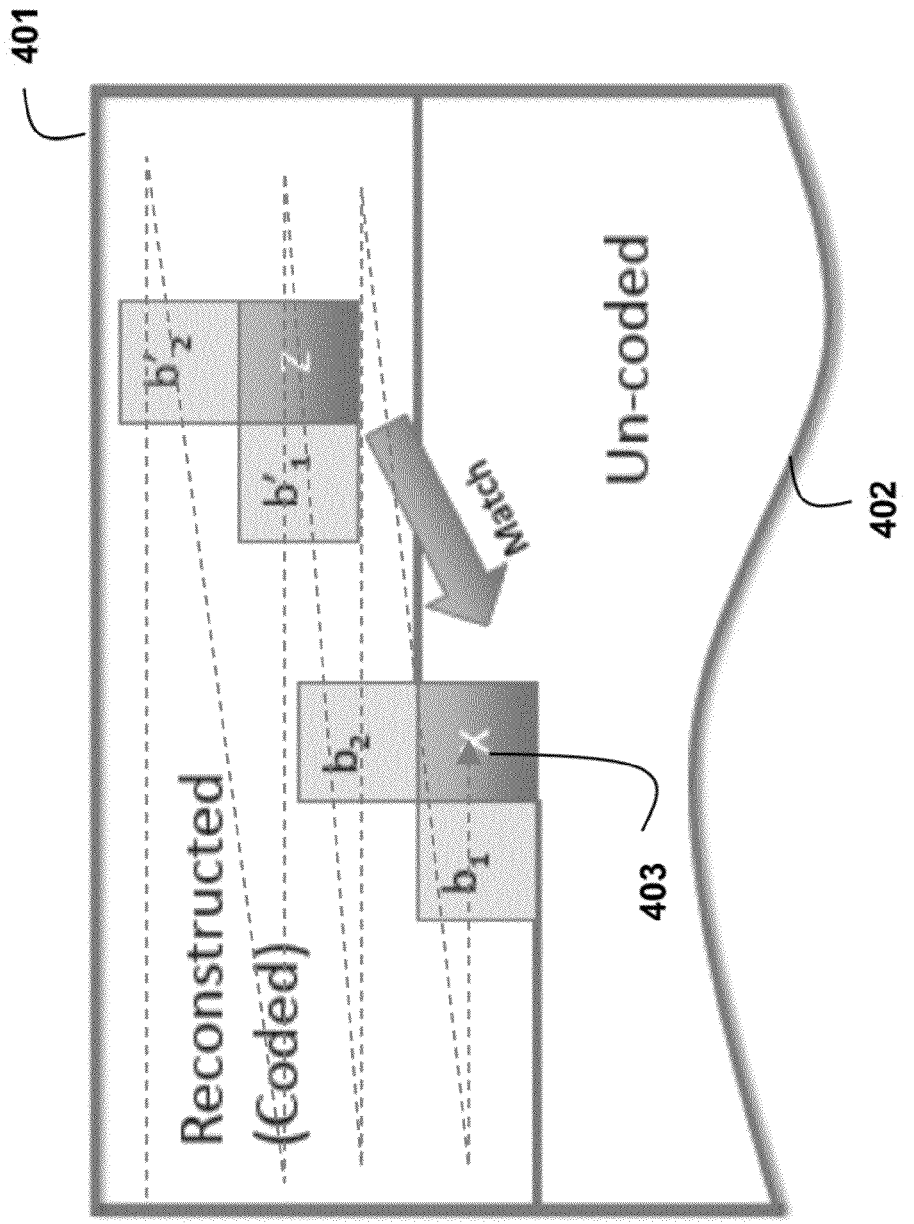
FIG. 4 is a block diagram of template matching according to embodiments of the invention.

FIG. 4 shows the details of the template matching 400 during prediction 300. The figure shows reconstructed (coded) blocks 401 above and to the left of the uncoded blocks 402. The target bock x is the next block to be coded in a selected scanning order 403. The target block x has both left $b_1$ and upper $b_2$ neighboring blocks having the same block size as the target. For each candidate in the search region, which is generally three to five times the block size, a quality associated with the candidate is estimated as $$D = \frac{D_Q(b_1, b'_1) + D_Q(b_2, b'_2)}{2}, \quad (11)$$

where $b'_1$ and $b'_2$ are left and upper blocks of the candidate z, and $D_Q$ is the perceptual quality measurement. This measurement is a function of structure similarity metrics and JND distortion measurement. For example $$D_Q(x, y) = \frac{SSIM(x, y)}{\gamma \log(D_{StD})}, \quad (12)$$

or $$D_Q(x, y) = SSIM(x, y),$$

where SSIM is defined in (1), γ is a constant scale factor and $D_{StD}$ is the supra-threshold distortion of y as compared to x. Let X, Y represent the DCT transform of x, y respectively.

The supra-threshold distortion (StD) is $$D_{StD} = \left\| \frac{|X-Y|}{T} \right\| = \left\| \frac{\varepsilon}{T} \right\|, \quad (13)$$

where T is the local JND in DCT sub-bands for this target block from (4) as described above.

If the target x has only one of the upper or left neighboring blocks, then for each candidate only the available neighboring block is used to determine D) in (11). If the target x is the first block processed in the image, then a uniform block with pixel values of 128 is used as the prediction. All the perceptual quality measurements of candidates in the search region are determined, except for the initial target. The measurements are sorted and the candidates with best K measurements are selected. If in some case the number of valid candidates is less than K, then K'<K candidates are also acceptable.

After the best candidates have been determined, we describe two prediction schemes. The predicted block $\hat{x}$ for the target block x is a weighted linear combination of up to K best candidates $z_k, k=\{0, 1, \ldots, K-1\}$. In other words, the number of candidate blocks are counted. The following describes two procedures to determine the weights $w_k$ for linearly combining the candidates $z_k$.

Joint Prediction and Quantization with Weight Signaling (WS)

Let the DCT transform of the target be $X_{m,n}$ and the DCT transform of candidates be $Z_{k,m,n}$, $m,n=\{0, 1, 2, \ldots, N-1\}$, $k=(0, 1, 2, \ldots, K-1)$. The prediction in the spatial domain is $\hat{x}_{i,j}$, $i,j=\{0, 1, 2, \ldots, N-1\}$, and the DCT transform is $\hat{X}_{m,n}$.

The residue of DCT coefficients is $$\varepsilon_{m,n} = X_{m,n} - \hat{X}_{m,n}, \quad m,n=\{0,1,\ldots,N-1\}. \quad (14)$$

We minimize the total number of quantization levels. At sub-band (m,n), the quantization level is the residue $\varepsilon_{m,n}$ in the DCT sub-band (m, n) divided by the quantization step $T_{m,n}$. Thus, the predictor determines the weights $w_k, k=0, 1, \ldots, K-1$ that minimize the p-norm of quantization levels:

$$w_k^* = \underset{w_k}{\arg\min} \sum_{m,n} \left| \frac{\varepsilon_{m,n}}{2T_{m,n}\max\left(\left|\frac{E(|X|)}{T_{m,n}}\right|^\varepsilon, 1\right)} \right|^p, \quad (15)$$

$$= \underset{w_k}{\arg\min} \sum_{m,n} \left| \frac{\sum_{i,j}\left(\sum_k w_k z_{i,j} - x_{i,j}\right)\psi_{i,m}\psi_{j,n}}{2T_{m,n}\max\left(\left|\frac{E(|X|)}{T_{m,n}}\right|^\varepsilon, 1\right)} \right|^p,$$

$$= \underset{w_k}{\arg\min} \sum_{m,n} \left| \frac{\sum_k w_k Z_{m,n} - X_{m,n}}{2T_{m,n}\max\left(\left|\frac{E(|X|)}{T_{m,n}}\right|^\varepsilon, 1\right)} \right|^p,$$

where as in (10), $\varepsilon=0.6$, $E(|X|)$ is the mean magnitude of sub-band coefficients of target, and $\psi_{i,m}, \psi_{j,n}$ comprise the DCT basis, and w* indicates the argument of the optimal solution of this minimization. The expression (15) comes from the linearity of DCT. The exponent p is typically 1 or 2.

Joint Prediction and Quantization Weighted by Quality Predictor (WQ)

A less complex predictor assumes that the high quality candidates have larger weights $$w_k = \frac{D_k}{\sum_k D_k}, \quad k = 0, 1, \ldots, K-1, \quad (16)$$

where $D_k=D(x,z_k)$ is the perceptual quality measurement between the target x and the candidate $z_k$ from the set of coded blocks 401.

Comparison of Predictors

Both the Joint Prediction and Quantization with Weight Signaling (WS) and Joint Prediction and Quantization Weighted by Quality (WQ) methods determine up to K weights. As a result, the prediction is a weighted linear combination of candidates:

$$\hat{x} = \sum_k w_k^* z_k, \quad k = 0, 1, \ldots, K-1. \quad (17)$$

Because the candidates are determined via template matching using a perceptual quality metric in the reconstructed image as described above, both the encoder and decoder can determine the same candidates. This eliminates the need for the encoder to signal the locations of the candidates to the decoder.

The WS transmits weights $w^*_k$, so that $\hat{x}$ can be determined directly from the best K candidates, and weights received by the decoder. WQ does not require extra bits to be signaled, because the weights are a function of quality measurements. In both schemes, the local mean of the magnitudes of target DCT coefficients $E(|X|)$ is used. However, this value is not available at the decoder. To resolve this issue, the decoder can estimate $E(|X|)$ using the mean magnitude DCT coefficients of candidates or the neighboring targets.

Rate-Distortion Optimization

Because we use perceptual quality metrics during prediction and quantization, the metric used in our Rate-Distortion Optimization (RDO) 250 for the output signal (bit-stream) 209, which controls our encoder as shown in FIG. 2, is modified correspondingly. The QP parameter in HEVC is no longer effective for our embodiments.

Our perceptional coding effectively adapts the coding scheme to the human perception in a way that still allows the removal of perceptually redundant information. This can yield a high quality picture while minimizing the bit-rate.

To further reduce the bit-rate, minimally perceptible image elements can be removed. This usually results in slightly visible visual distortions or Minimally-Noticeable-Distortion (MND). To control the rate of the coder, we use a modified MND. Therefore, $T_{CSF}$ is scaled by a constant $\zeta \geq 1$ $$|\varepsilon_{m,n}| < \zeta \cdot T_{CSF}(m,n) \cdot a'_{CM}(m,n), \quad (18)$$

where $$a'_{CM}(m,n) = \begin{cases} \max\left(1, \left|\frac{E(|X|)}{\zeta T_{DCT}(m,n)}\right|^\varepsilon\right), & m \neq 0, n \neq 0 \\ 1, & \text{otherwise.} \end{cases} \quad (19)$$

Thus, a larger $\zeta$ decreases the rate. Then, the cost function in HEVC is modified as:

$$C = D_{StD} + \lambda R, \quad (20)$$

where $D_{StD}$ defined in (13) and $\lambda$ is a constant.

Decoder

Figure 5:
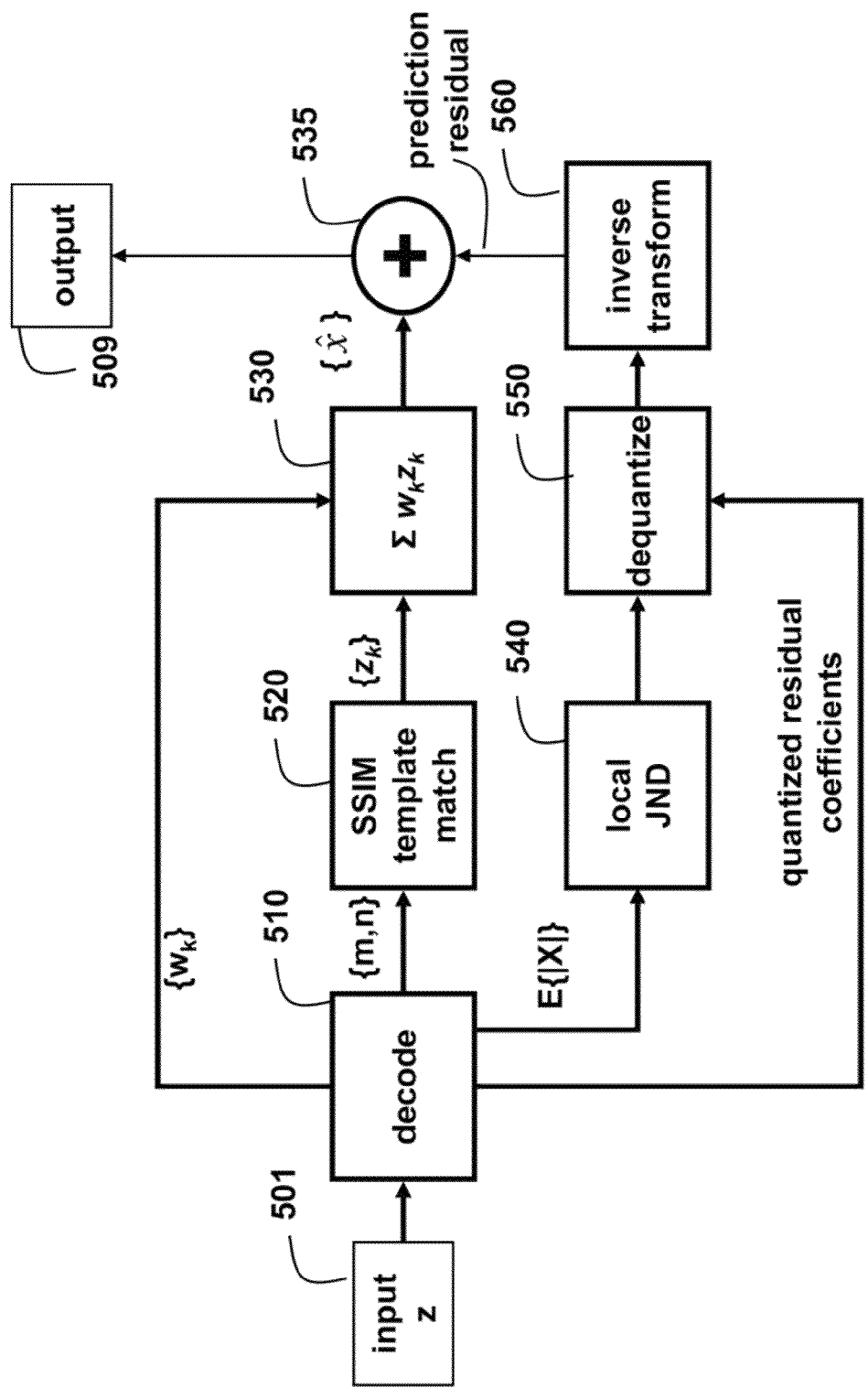
FIG. 5 is a block diagram of a decoder according to embodiments of the invention.

FIG. 5 shows one embodiment of a decoder 500 according to embodiments of the invention. The decoder essentially operates in a reverse order than the encoder. Input is the coded quantized prediction residuals z 501 for the next block to be decoded by the decoder 510. Output from the decoder block 510 includes weights {w}, target position {m, n}, the average magnitude E{|X|} of the DCT of the target block and the transformed peduction residual. The position of current target block {m, n} is not necessary transmitted because the order is implied from the raster scan order. An alternative here is the encoder does not transmit E{|X|}, instead, let the decoder estimate this value by the surrounding block DCT coefficients values in the reconstructed image region. In 520 the K candidates $\{z_k\}$ of current target block are found by template matching using the SSIM criteria. In 530 the prediction $\{\hat{x}\}$ is the linear combination of $\{z_k\}$ using K weightings {w}(or $w_k$). An alternative is to use a nonlinear combination of the candidate blocks, without using weights, such as by computing the median of the candidates. Another alternative is to make the weights equal, such as 1/K. E{|X|} is used to compute the local JND in 540 and the local JND value are used to adapt the quantization matrix in the dequantize block 550. The dequantized DCT residual is given by 550 using the received residual coefficients and the adapted quantization matrix. The inverse DCT transform 560 outputs the prediction residue image block pixels combined 535 with the output of 530 procuses the reconstructed target block 509. The alternatives described above can also be implemented in the encoder.

Figure 6:
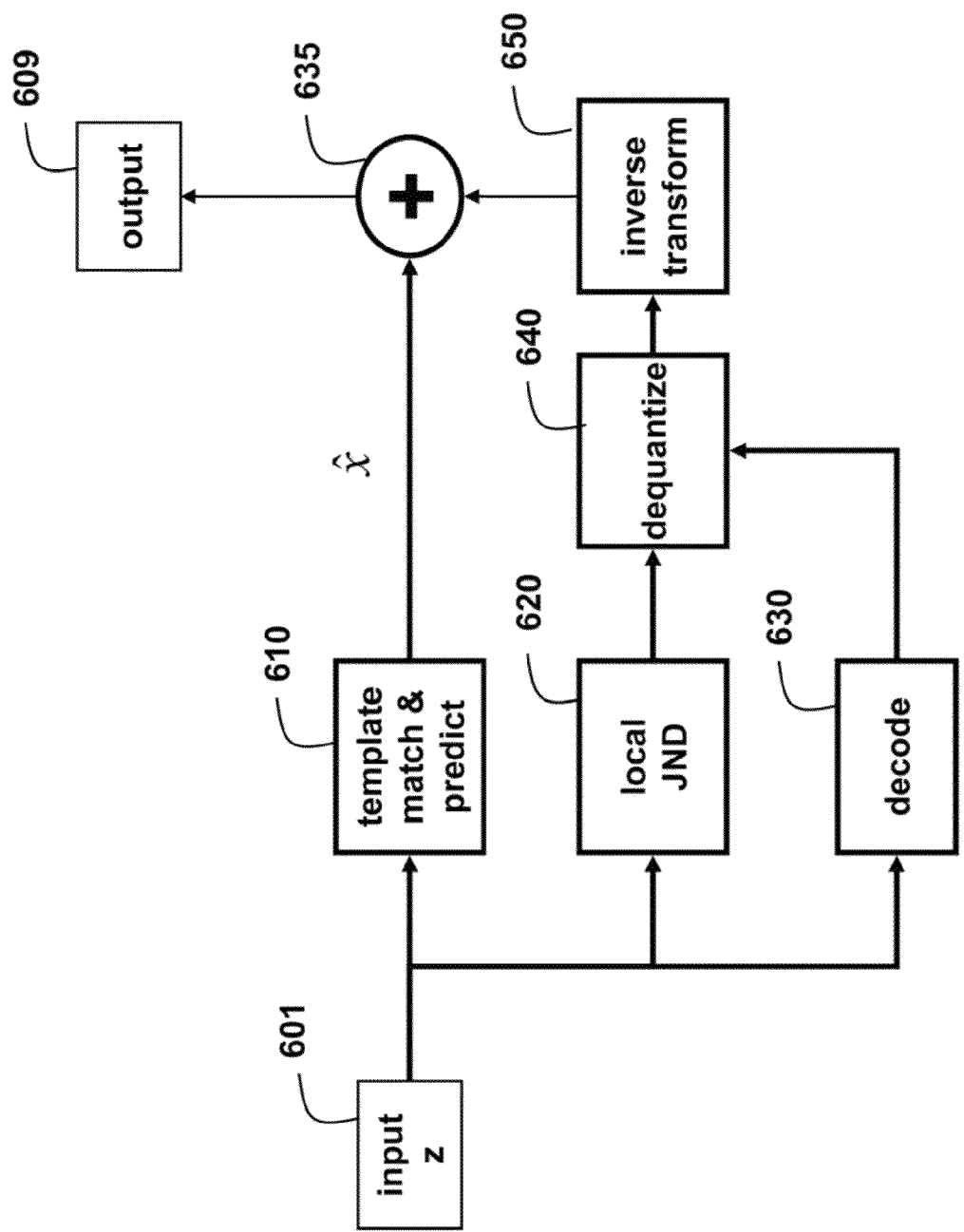
FIG. 6 is a block diagram of another embodiment of the decoder.

FIG. 6 differs from FIG. 5 in that the weights $\{w_k\}$ are not transmitted. In 610, the template matching using the SSIM criteria and prediction is performed so that the weights $\{w_k\}$ are a function of SSIM scores for each candidate. The local JND is computed using the estimated E(|X|) in 620. The DCT residue coefficients are decoded from the local JND 630. In 640, the output of 620 is used to adapte the quantization matrix, and with the output of 630, 640 can output the dequantized DCT residual coefficients. The output of 640 is inversely DCT transformed into residual pixel values in 650. And the output of 610 and output of 650 are combined 635 to produce as output 609 the reconstructed target block.

Effect of the Invention

Modeling the perceptual quality of the Human Vision System (HVS) is still problematic. SSIM alone cannot accurately achieve the quality measurement performance of HVS.

The conventional JND models derived from simple psychophysics studies may not describe HVS thoroughly. As a result, perceivable distortion, which is not characterized by the JND model, may still exist.

The embodiments of the invention provide a novel coding that jointly applies SSIM and JND models for prediction, quantization and rate-distortion optimization within the HEVC proposed standard.

We describe a novel predictor that uses template matching and a perceptual quality measurement to select multiple prediction candidates. The perceptual quality measurement is derived from a joint SSIM and JND model.

The selected candidates are combined, either by minimizing a Supra-threshold Distortion (StD) during quantization, or via a linear combination weighted by perceptual quality.

We use a modified JND model, and StD during rate-distortion optimization, resulting in a better perceptual quality than a coder designed according to the current HEVC standard. The perceptual quality can also be measured by the StD.

The present coder, which performs joint perceptual optimization of prediction and quantization, can be generalized for other image and video coding techniques. It is also understood that the embodiments of the invention can be used within and outside the scope of the HEVC standard.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

APPENDIX

Definitions of Terms

The following terms are used in the detailed description to explain the various embodiments, or by the working draft of the HEVC standard.

Coding Layers: The hierarchical coding layers defined in the HEVC standard include video sequence, image, slice, and treeblock layers. Higher layers contain lower layers.

Treeblock: According to the proposed standard, an image is partitioned into slices, and each slice is partitioned into a sequence of treeblocks (TBs) ordered consecutively in a raster scan order. Images and TBs are broadly analogous to frames and macroblocks respectively, in existing video coding standards such as H.264/AVC. The maximum allowed size of the TB is 64×64 pixels luma (intensity) and chroma (color) samples.

Coding Unit: A Coding Unit (CU) is the basic unit of splitting used for intra and inter prediction. Intra prediction operates in the spatial domain of a single image, while inter prediction operates in the temporal domain among the image to be predicted and a set of previously-decoded images. The CU can have a square shape, and can be 128×128 (LCU), 64×64, 32×32, 16×16 and 8×8 pixels. The CU allows recursive splitting into four equally sized blocks, starting from the TB. This process gives a content-adaptive coding tree structure comprised of CU blocks that can be as large as the TB, or as small as 8×8 pixels.

Prediction Unit (PU): A Prediction Unit (PU) is the basic unit used for carrying the information (data) related to the prediction processes. In general, the PU is not restricted to being square in shape, in order to facilitate partitioning, which matches, for example, the boundaries of real objects in the image. Each CU may contain one or more PUs.

Scan Order: Images are coded block by block in a predefined order called the scan order. For example, raster scan order, zig-zag order and etc.

Causal Region or Reconstructed Image: The region where image has been coded and can be reconstructed in sequence of scan order.

Target: The input block to be coded in the scan order in an encoder, or the input block to be reconstructed in the scan order in a decoder.

Block Size: The N×N dimensions of the target in pixels.

SSIM: Structural Similarity Metric, see Wang et al. "Foveation scalable video coding with automatic fixation selection," Image Processing, IEEE Transactions, vol. 12, no. 2, pp. 243-254, February 2003.

SSIM Template Matching: Determines the SSIM of the template of the Target

Search Range: The range in which SSIM template matching is performed.

Candidate: Each block with a size equal to the target block size is a candidate.

JND: Just noticeable distortion is the threshold at which the human visual system can perceive distortion at certain luminance, frequency and masking conditions.

JND Based Optimization The optimization indicates generically the way to minimize the distortion that is noticeable, e.g., supra-threshold distortion.

x, y, b, z: Lower case characters represent the signal in spatial domain.

X, Y, B, Z: Upper case characters represent the signal infrequency domain.

We claim:

1. A method for encoding a sequence of images of pixels, wherein each image includes one or more blocks processed in a predetermined order, comprising for each block the steps of:
    determining a just-noticeable-distortion (JND) for the block;
    performing template matching on the block to select candidate blocks in the corresponding image and weights according to a structural similarity and a perceptual distortion of the block with respect to the candidate blocks, wherein the perceptual distortion is a function of the JND, and wherein the weights are equal and a function of a count of a number of the candidate blocks;
    determining a prediction residual, wherein the prediction residual is a difference between the input block and an output of a filter combining the candidate blocks;
    transforming the prediction residual to produce a transformed prediction residual;
    quantizing the transformed prediction residual according to the JND to produce a quantized prediction residual, and wherein the template matching and the quantizing are optimized jointly using the perceptual distortion; and
    entropy encoding the quantized prediction residual and the weights for a bitstream, wherein the steps are performed in an encoder.

2. The method of claim 1, wherein an average magnitude of the transformed prediction residual is signaled in the bitstream, and the JND is a function of the average magnitude.

3. The method of claim 1, wherein an average magnitude of the transformed prediction residual is estimated based on previously encoded blocks.

4. The method of claim 1, wherein the filter is a nonlinear combination of the candidate blocks.

5. The method of claim 1, wherein the JND is determined from perceived frequency components of the pixels.

6. The method of claim 1, wherein the JND is determined from perceived intensity components of the pixels.

7. The method of claim 1, wherein the filter is a median filter.

8. The method of claim 1, further comprising:
    minimizing a rate-distortion of the bitstream using according to a perceptual distortion metric.

9. The method of claim 8, wherein the perceptual distortion metric is a function of the perceptual distortion and the JND.

10. The method of claim 1, wherein the JND is a function of motion in the sequence of images.

11. The method of claim 1, wherein the JND includes measurements based on previously encoded blocks.

12. The method of claim 1, wherein the perceptual distortion is the structural similarity divided by a weighted supra-threshold distortion metric.

13. The method of claim 1, wherein the perceptual distortion is the structural similarity added to a weighted supra-threshold distortion metric.

14. The method of claim 1, wherein the weights are determined as the perceptual distortion for a given candidate block divided by a sum of perceptual distortions of all the candidate blocks.

15. The method of claim 1, further comprising:
    wherein the encoding is according to a High Efficiency Video Coding (HEVC) standard, and wherein the HEVC standard includes a set of prediction modes, and an additional prediction mode for the set of predictions is the output of the filter.

16. The method of claim 15, wherein a distortion resulting from a particular prediction mode is weighted by a function of the JND.

17. The method of claim 1, further comprising:
    entropy decoding the bitstream to obtain the quantized prediction residual, and the weights;
    performing an inverse quantizing of the quantized prediction residual to obtain a reconstructed prediction residual;
    performing the template matching on previously decoded blocks to obtain the candidate blocks;
    determining a prediction corresponding to the output of the filter;
    combining the reconstructed prediction residual and the prediction to obtain a decoded block.

18. The method of claim 17, wherein an average magnitude is decoded from the bitstream, and the JND is a function of the average magnitude.

* * * * *